(12) United States Patent
McDowell

(10) Patent No.: US 6,582,245 B2
(45) Date of Patent: Jun. 24, 2003

(54) LEAD-IN ACCESSORY FOR A STACKED SMART CARD READER

(75) Inventor: Jennifer Lyn McDowell, Suwanee, GA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/892,589

(22) Filed: Jun. 27, 2001

(65) Prior Publication Data

US 2002/0019162 A1 Feb. 14, 2002

Related U.S. Application Data

(60) Provisional application No. 60/215,568, filed on Jun. 30, 2000.

(51) Int. Cl.[7] .............................................. H01R 13/64
(52) U.S. Cl. ...................... 439/377; 439/541.5; 439/374
(58) Field of Search ................................ 439/377, 374, 439/630, 260, 341.5

(56) References Cited

U.S. PATENT DOCUMENTS

| | | | | |
|---|---|---|---|---|
| 3,768,066 A | * | 10/1973 | Mattingly, Jr. et al. ...... | 439/374 |
| 4,695,108 A | * | 9/1987 | Ichitsubo ..................... | 439/260 |
| 4,795,354 A | * | 1/1989 | Owen .......................... | 439/630 |
| 5,129,831 A | * | 7/1992 | Locati ......................... | 439/374 |
| 5,470,246 A | | 11/1995 | Mosquera .................... | 439/260 |
| 5,486,118 A | * | 1/1996 | Colleran et al. ............. | 439/374 |
| 5,697,805 A | * | 12/1997 | Orstad et al. ................ | 439/374 |
| 5,775,949 A | | 7/1998 | Bricaud et al. .............. | 439/630 |
| 5,901,049 A | | 5/1999 | Schmidt et al. ............. | 361/787 |
| 5,997,345 A | | 12/1999 | Inadama ...................... | 439/489 |
| 6,039,599 A | | 3/2000 | Benjamin et al. ........... | 439/489 |
| 6,132,243 A | * | 10/2000 | Hirata et al. ............. | 439/541.5 |
| 6,238,227 B1 | * | 5/2001 | Wu et al. .................... | 439/260 |
| 6,296,518 B1 | * | 10/2001 | Avery et al. ............. | 439/541.5 |
| 6,319,052 B1 | * | 11/2001 | Chang ......................... | 439/260 |

* cited by examiner

Primary Examiner—Renee Luebke
Assistant Examiner—Felix O. Figueroa
(74) Attorney, Agent, or Firm—Hoffmann & Baron, LLP

(57) ABSTRACT

A lead-in accessory for a stacked smart card reader comprises a generally rectangular insulative housing having a front surface, a back surface and sidewalls therebetween. The housing defines, in a particular configuration, a pair of spaced, substantially parallel card insertion ingresses extending through the front surface and the back surface of the housing. A pair of opposing snap tabs project from the back surface of the housing for removable attachment of the accessory to the smart reader. The smart reader typically comprises a connector housing having at least two spaced card receiving slots for receipt therein of smart cards. Upon attachment of the accessory to the smart card reader, the pair of ingresses are substantially aligned with the receiving slots in the reader connector to thereby effectively extend outwardly the card receiving face of the smart reader.

8 Claims, 4 Drawing Sheets

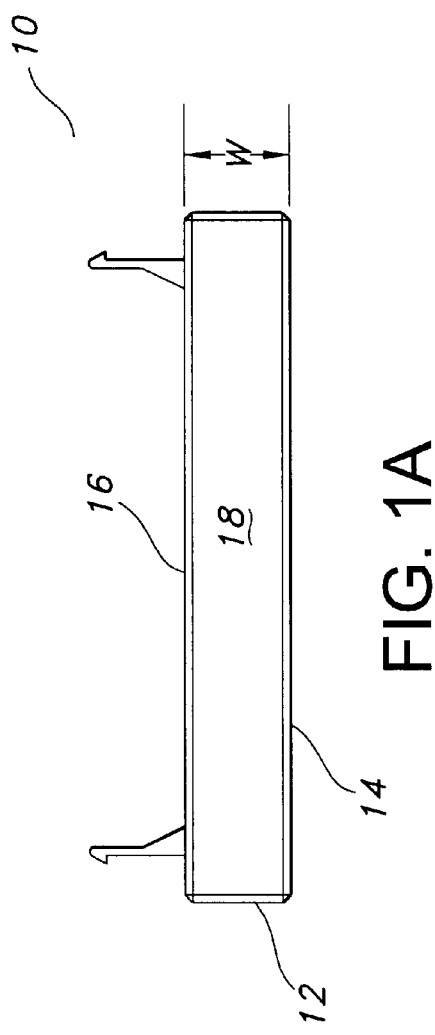
FIG. 1B
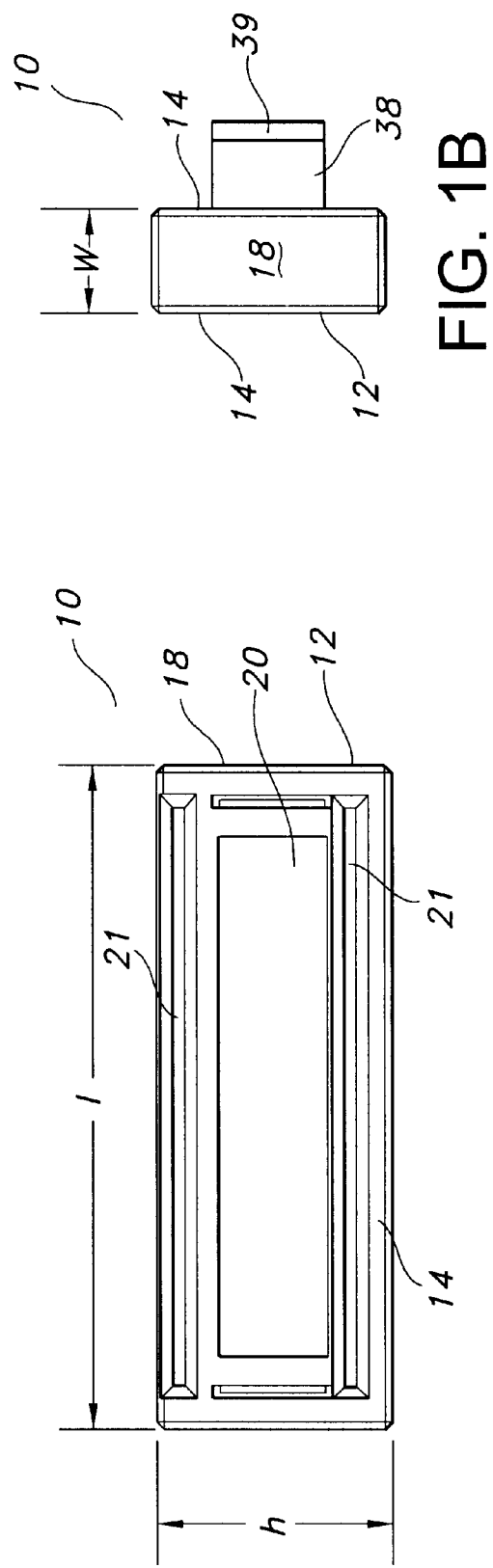
FIG. 1A
FIG. 1

LEAD-IN ACCESSORY FOR A STACKED SMART CARD READER

The present application claims priority to U.S. Ser. No. 60/215,568, filed Jun. 30, 2000, and entitled "Lead-In Accessory for a Stacked Smart Card Reader".

FIELD OF THE INVENTION

The present invention is directed generally to an accessory that customizes a standard smart card connector configuration. More particularly, the present invention is directed to a removably attachable lead-in accessory for a smart card connector that enables inexpensive customization of a smart card connector while maintaining a linear card insertion path.

BACKGROUND OF THE INVENTION

The electronic industry has seen growth in the use of flat plastic cards incorporating computer chips therein. These chip or IC cards are also commonly referred as to as "smart cards". A smart card is a card incorporating at least one electronic component to which electrical connection must be made. These cards include contact pads so as to allow electrical connection to the electronic component on the card. Smart cards are commonly used in various consumer-oriented machines such as telephones, bank machines, vending machines, mobile phones and electronics and the like. In this disclosure, the terms "IC card", "chip card" and "smart card" will be used interchangeably.

The art has seen numerous electrical connectors specifically designed for use in removably connecting various types of smart cards. Such connectors generally provide a housing supporting a plurality of electrical contacts that terminate with a printed circuit board (PCB) supporting the connector thereon. Although such connectors effectively establish electrical contact between an IC card and a PCB, the use thereof may not be desirable in configurations where conservation of materials and space is essential. In situations where a smart card application must be customized to meet the particular demands of the desired application, it may be necessary to modify the connector to accommodate multiple cards or to optimize PCB real estate so as to accommodate additional components thereon (i.e. such as by placing the connector at a rearwardmost portion of the PCB relative to the point of card entry). In such situations, it becomes difficult to maintain the simplicity of the connector and the integrity of the card insertion path.

Thus, it is desirable to provide a device that enables customization of standard smart card connectors so as to enable placement of the connector at a significant distance relative to a point of card entry. It is further desirable to provide such a device that is inexpensively manufactured and which is removably detachable so as to be transported among several smart card connectors without affecting the configuration or operation of the connector itself.

SUMMARY OF THE INVENTION

It is an object of the present invention to easily and inexpensively customize a standard manufacture smart card connector.

It is another object of the present invention to extend a face of a smart card connector so as to enable placement of the connector at a rearmost portion of a printed circuit board relative to the point of card entry. This is accomplished by providing additional lead-in for a card while maintaining the integrity of the card insertion path.

It is still another object of the present invention to provide an independent, removably attachable accessory for a smart card connector that is readily transportable and sufficiently complements the modularity of a stacked smart card connector configuration.

In the efficient attainment of these and other objectives, the present invention provides a lead-in accessory for a smart card connector that is particularly adapted for a stacked smart card connector configuration. The lead in accessory includes a substantially rectangular housing defined by a front surface, a rear surface and a peripheral side wall extending therebetween. The front surface defines a primary orifice therein having peripheral dimensions corresponding to those of a corresponding space in the smart card connector. This space may be reserved for placement of additional component. The front surface desirably includes at least one card insertion ingress that extends from the front surface to the rear surface of the housing. The card insertion ingress corresponds to a card insertion recess defined in the smart card connector, thereby preserving the integrity of the card insertion path from the front surface of the accessory to the rearmost surface of the smart card connector. A pair of opposing snap tabs also protrude normally from the rear surface of the housing wherein the tabs are desirably equi-linearly disposed from one another at a distance corresponding to an inner wall of a smart card connector into which the accessory is to be inserted. Each tab includes a catch at a free extent thereof which establishes mechanical engagement with a corresponding recess in the smart card connector.

In a particular aspect of the invention, a lead-in accessory for a stacked smart card reader comprises an insulative housing including a front surface, a back surface and sidewalls extending therebetween. The accessory housing has at least one card insertion ingress in the housing extending through the front surface and the back surface. The accessory includes an attachment member for removable attachment of the accessory to the smart card reader in such a manner that the card insertion ingress is substantially linearly aligned with a card receiving slot in the card reader, to thereby effectively extend outwardly a card receiving face of the smart card reader.

BRIEF DESCRIPTION OF THE DRAWINGS

FIG. 1 is a front view of a lead-in accessory of the present invention.

FIGS. 1A and 1B are a top view and a side view, respectively, of the lead-in accessory of FIG. 1.

DETAILED DESCRIPTION OF THE PREFERRED EMBODIMENT

Figure 2:
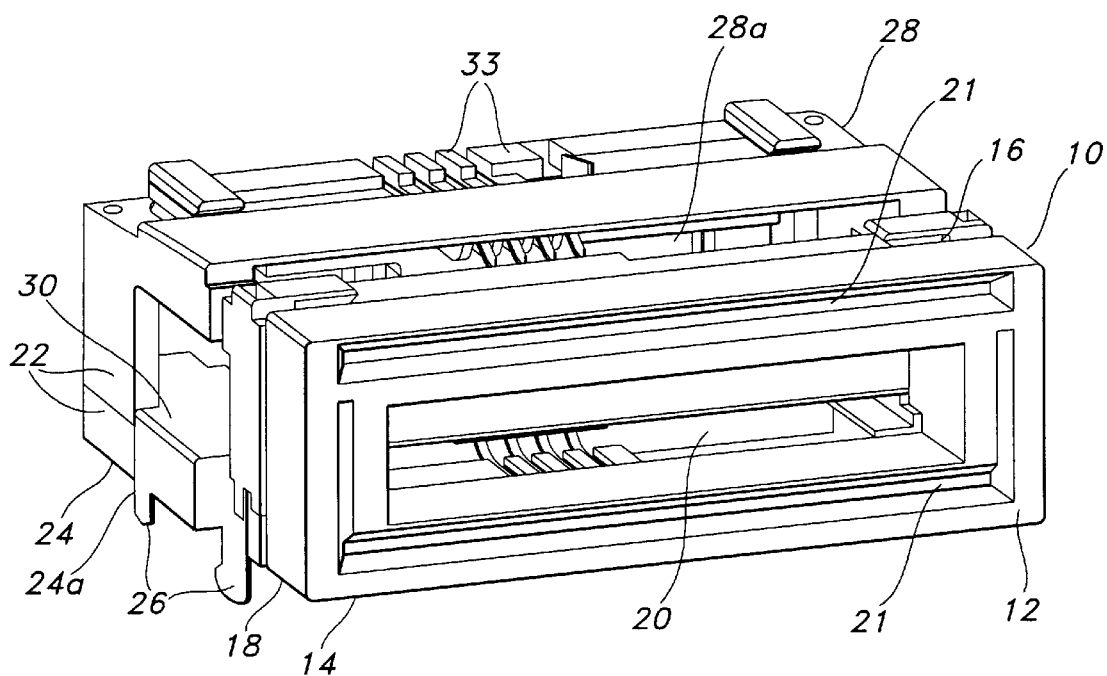
FIGS. 2, 3 and 4 are a front perspective view, a top perspective view and a side view, respectively, of the lead-in accessory of FIG. 1 in combination with a stacked smart card reader.

Now referring to the Figures, wherein like elements are identically numbered, a preferred embodiment of the lead-in accessory 10 of the present invention is illustrated in FIG. 1. Further referring to FIGS. 1A and 1B, accessory 10 is defined by a substantially rectangular housing 12 molded from an insulative plastic. Housing 12 has a front surface 14, a back surface 16 and a peripheral side wall 18 extending therebetween. Front surface 14 defines a primary orifice 20 therein along with at least one card insertion ingress 21 through which a smart card can be inserted along a card insertion path. Operation of accessory 10 in combination with a smart card connector is further described hereinbelow.

Figure 3:
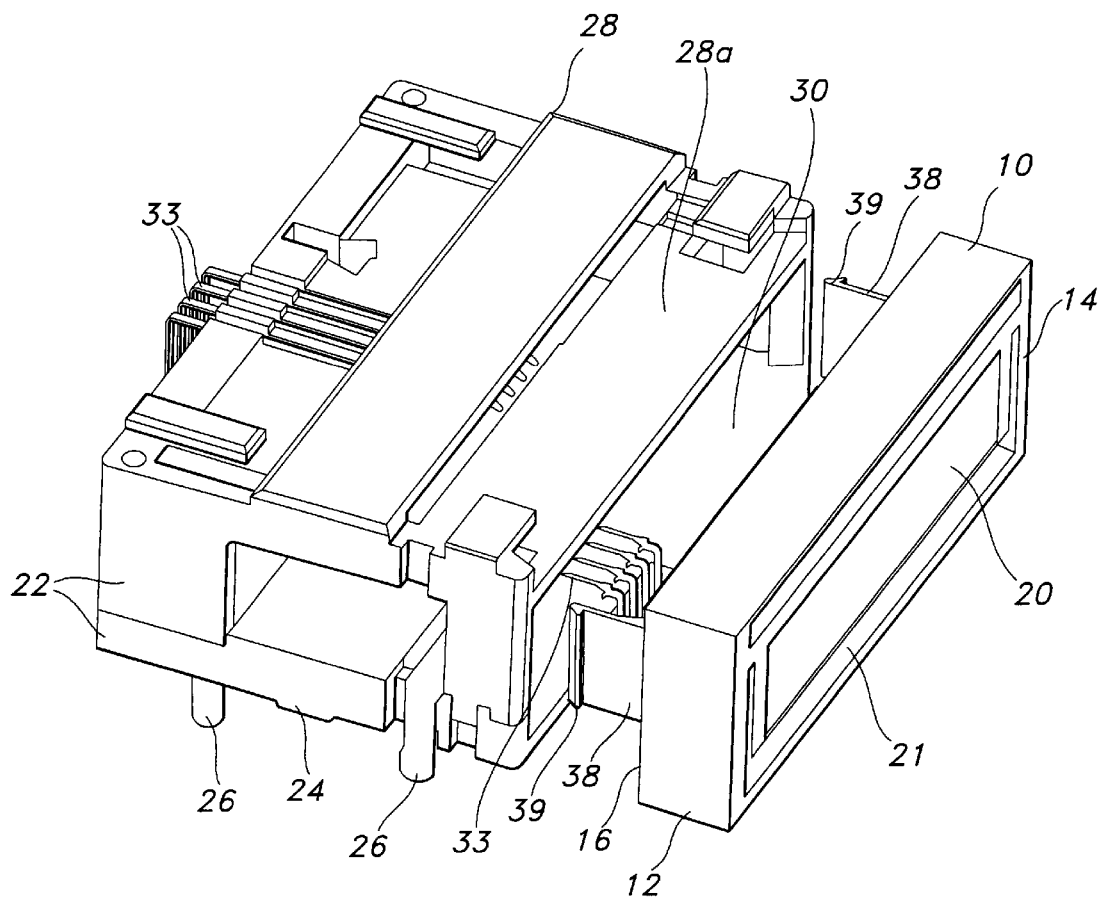
Figure 4:
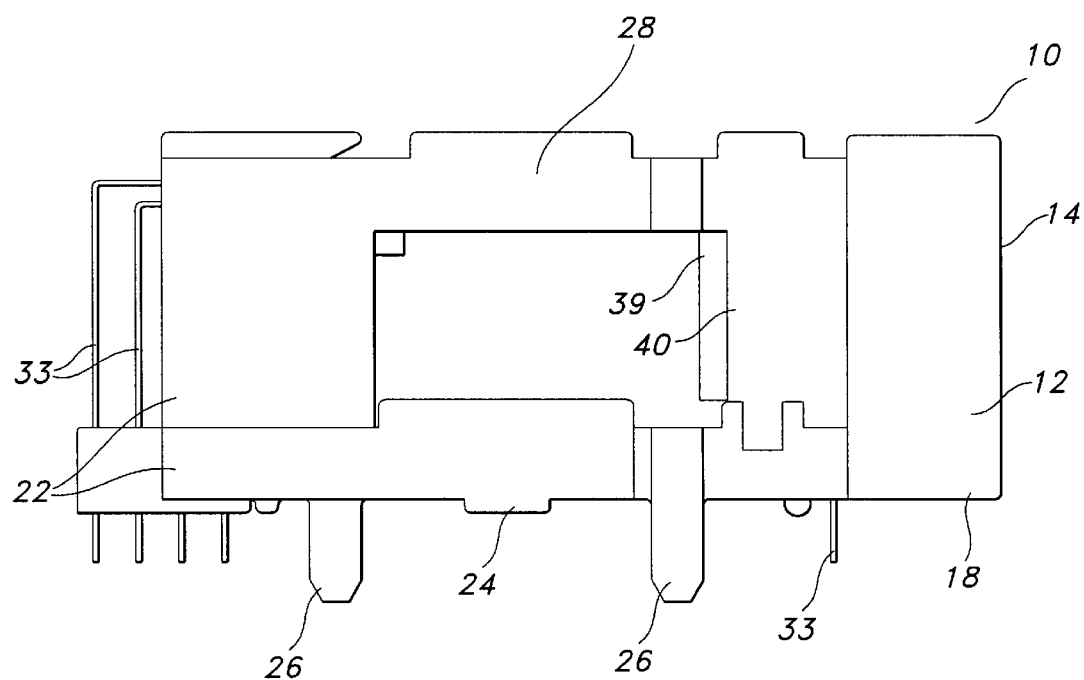

Lead-in accessory 10 is particularly adapted for a stacked smart card connector assembly 22 such as that shown in FIGS. 2, 3 and 4. Assembly 22 is a stacked smart card reader configuration that conserves real estate on a printed circuit board (PCB) so as to enable connection of a plurality of smart cards and thereby facilitate more efficient transfer of data. The configuration and operation of assembly 22 is specifically described in commonly assigned application U.S. Ser. No. 60/154,444, filed Sep. 17, 1999 and entitled "Stacked Smart Card Reader", which is incorporated by reference herein.

Connector assembly 22 includes an insulative base 24 affixed to a PCB (not shown) by one or more mounting posts 26. Connector assembly 22 further includes an assembly cover 28 positioned in overlying spaced parallel relationship with respect to base 24 so as to define a significant elevation 30 therebetween for placement of additional components therebetween. Base 24 defines a slot 24a on a top surface thereof, and cover 28 similarly defines a slot 28a on a top surface thereof, wherein slots 24a and 28a define a generally linear card insertion path for acceptance of a smart card therein. Slots 24a and 28a are longitudinally extending spaces that span the extent of connector assembly 22 from a frontmost portion thereof to a rearmost portion thereof. Slots 24a and 28a help to guide a smart card into electrical and mechanical engagement with a plurality of contacts 33 that extend exteriorly of connector assembly 22.

Further referring to FIGS. 2, 3 and 4, lead-in accessory establishes snap-on engagement with connector assembly 22 via a pair of snap tabs 38 normally protruding from back surface 16 (as further shown in FIG. 1B). Snap tabs 38 are spaced fully interiorly of the peripheral side wall 18 and are desirably equilinearly spaced from one another by a distance that corresponds to the dimensions of space 30. Each snap tab 38 further includes a catch 39 flared from an extent thereof wherein catch 39 is retained within a correspondingly sized and shaped recess in cover 28 (not shown). Catch 39 may alternately engage a retention surface 40 defined along a support member of cover 28 (as particularly shown in FIG. 4). Linear insertion of lead-in accessory 10 through space 30 establishes a snap-fit with connector assembly 22 such that alignment of primary orifice 20 with space 30 is achieved, as is alignment of each card insertion ingress 21 with a corresponding slot 24a or 28a.

In operation, after attachment of accessory 10 to assembly 22, a smart card is inserted through either ingress 21. Each ingress 21 is retained in alignment with a corresponding slot 24a or 28a so that insertion of a card through ingress 21 maintains a linear insertion path into the slot and into eventual engagement with contacts 33. Electrical connection (and "reading of the card") is thereafter provided by conductive connection between contact pads on the smart card and contacts 33.

The preferred embodiment of lead-in accessory 10 is not limited to the configuration illustrated and described herein. It is inherent in the present inventive design that the accessory can be inexpensively customized so as to derive a transportable and removably attachable accessory for standard smart card connectors. Thus, while the particular embodiment of the present invention has been shown and described, it will be obvious to those skilled in the art that changes and modifications may be made without departing from the fundamental teachings of the invention. The matter set forth in the foregoing description and accompanying drawings is offered by way of illustration only and not as a limitation, the true scope of the invention being set forth in the claims appended hereto.

I claim:

1. In combination, a stacked smart card reader and a lead-in accessory, said stacked smart card reader comprising:

a connector for connecting to a circuit board, said connector including an insulative connector housing having a front face and a rear face, a plurality of electrical contacts disposed adjacent said rear face and having contact portions projecting from said connector housing for connection to said circuit board, said housing having at least two card insertion slots extending through said front face and into said connector housing, each slot being in communication with one or more of said electrical contacts; and said lead-in accessory comprising:

an insulative accessory housing including a front surface, a back surface spaced therefrom and sidewalls extending therebetween, at least one card insertion ingress extending through said front surface and said back surface, an attachment member projecting outwardly from said back surface and through said front face of said connector and removably attaching said accessory to said connector housing at a location spaced inwardly of said front face of said connector, such that said at least one card insertion ingress is substantially aligned with one of said at least two card insertion slots in said connector housing.

2. The combination according to claim 1, wherein said accessory has a second card insertion ingress extending through said front surface and said back surface of said accessory housing, said second ingress being in substantial alignment with another of said insertion slots in said connector housing.

3. The combination according to claim 2, wherein said attachment member comprises a pair of spaced, flexible tabs projecting outwardly from said accessory and in releasable receipt by said connector housing at said location spaced inwardly of said connector front face.

4. The combination according to claim 3, wherein said housing further includes a space therein through said front face thereof and between said at least two card insertion slots.

5. The combination according to claim 4, wherein said attachment member tabs are received in said connector housing space, said connector housing defining at said location spaced inwardly of said connector front face a surface in releasable attachment with said tabs.

6. The combination according to claim 4, wherein said accessory housing further includes an orifice extending through said front surface and said back surface, said orifice being substantially aligned with said space in said connector housing.

7. The combination according to claim 6, wherein said accessory housing is of generally rectangular configuration.

8. The combination according to claim 7, wherein said accessory housing is formed of molded insulative plastic.

* * * * *